(12) United States Patent
Harrower et al.

(10) Patent No.: US 8,455,404 B2
(45) Date of Patent: *Jun. 4, 2013

(54) TREATMENT FLUIDS WITH IMPROVED SHALE INHIBITION AND METHODS OF USE IN SUBTERRANEAN OPERATIONS

(75) Inventors: Elaine Harrower, Balmedie (GB); Arthur Youngson, Cults (GB); Colin Temple, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 2102 days.

This patent is subject to a terminal disclaimer.

(21) Appl. No.: 11/183,113

(22) Filed: Jul. 15, 2005

(65) Prior Publication Data

US 2007/0015668 A1 Jan. 18, 2007

(51) Int. Cl.
C09K 8/12 (2006.01)
C09K 8/52 (2006.01)

(52) U.S. Cl.
USPC ........... 507/130; 507/123; 507/125; 507/137; 507/140; 507/141; 507/221; 507/223; 507/229; 507/231; 507/242; 507/263; 507/269; 507/276; 166/305.1

(58) Field of Classification Search
None
See application file for complete search history.

(56) References Cited

U.S. PATENT DOCUMENTS

| | | | |
|---|---|---|---|
| 2,146,693 A | 2/1939 | Vietti et al. | |
| 2,165,823 A | 7/1939 | Vietti et al. | |
| 2,205,609 A | 6/1940 | Vail et al. | |
| 2,294,078 A | 8/1942 | Dow et al. | 166/22 |
| 2,990,016 A | 6/1961 | Goins et al. | |
| 3,025,234 A | 3/1962 | Canterino | |
| 3,235,490 A | 2/1966 | Goren | 210/52 |
| 3,252,904 A * | 5/1966 | Carpenter | 166/283 |
| 3,359,225 A | 12/1967 | Weisend | |
| 3,380,529 A | 4/1968 | Hendrickson | |
| 3,397,744 A | 8/1968 | Hort et al. | |
| 3,504,746 A | 4/1970 | Frefield et al. | |
| 3,554,287 A | 1/1971 | Eilers et al. | |
| 3,617,095 A | 11/1971 | Lissant | |
| 3,623,554 A | 11/1971 | Pence, Jr. | 166/294 |
| 3,640,343 A | 2/1972 | Darley | |
| 3,679,001 A | 7/1972 | Hill | |
| 3,738,437 A | 6/1973 | Scheuerman | |
| 3,746,109 A * | 7/1973 | Darley | 175/66 |
| 3,843,524 A | 10/1974 | Perricone at al. | |
| 3,915,232 A | 10/1975 | Gruesbeck et al. | 166/295 |
| 3,915,323 A | 10/1975 | Underhill | 414/462 |
| 3,924,684 A | 12/1975 | Tate | |
| 3,927,717 A | 12/1975 | Tate | |
| 3,934,651 A | 1/1976 | Nierode et al. | 166/282 |
| 3,956,145 A | 5/1976 | Christopher, Jr. et al. | 507/212 |
| 3,976,140 A | 8/1976 | Shaughnessy et al. | 166/295 |
| 4,018,286 A | 4/1977 | Gall et al. | |
| 4,033,893 A | 7/1977 | Mondshine | |
| 4,039,029 A | 8/1977 | Gall | 166/294 |
| 4,042,529 A | 8/1977 | Nimerick et al. | 252/363.5 |
| 4,045,357 A | 8/1977 | Reed | |
| 4,079,011 A | 3/1978 | Tate | |
| 4,098,337 A | 7/1978 | Argabright et al. | |
| 4,141,416 A | 2/1979 | Holm | |
| 4,142,595 A | 3/1979 | Anderson et al. | |
| 4,235,728 A | 11/1980 | Schulz et al. | |
| 4,302,341 A | 11/1981 | Watson | |
| 4,343,363 A | 8/1982 | Norton et al. | |
| 4,353,806 A | 10/1982 | Canter et al. | 507/229 |
| 4,360,061 A | 11/1982 | Canter et al. | 166/270.1 |
| 4,391,643 A | 7/1983 | Murphey | |
| 4,405,357 A | 9/1983 | Chang | |
| 4,440,649 A | 4/1984 | Loftin et al. | |
| 4,440,653 A | 4/1984 | Briscoe et al. | 507/202 |
| 4,460,627 A | 7/1984 | Weaver et al. | |
| 4,466,831 A | 8/1984 | Murphhey | |
| 4,486,316 A | 12/1984 | Carriere et al. | |
| 4,488,601 A | 12/1984 | Hammett | 166/270.1 |
| 4,490,261 A | 12/1984 | Heilweil | |
| 4,498,994 A * | 2/1985 | Heilweil | 507/120 |
| 4,514,310 A * | 4/1985 | Heilweil | 507/229 |
| 4,521,136 A | 6/1985 | Murphey | |
| 4,525,285 A | 6/1985 | Son et al. | |
| 4,532,052 A | 7/1985 | Weaver et al. | |
| 4,536,297 A | 8/1985 | Loftin et al. | |
| 4,536,303 A | 8/1985 | Borchardt | 507/222 |
| 4,588,032 A | 5/1986 | Weigand et al. | 166/291 |
| 4,625,802 A * | 12/1986 | Sydansk | 166/292 |
| 4,627,495 A | 12/1986 | Harris et al. | 166/280.1 |
| 4,644,020 A | 2/1987 | Stahl | |
| 4,659,750 A | 4/1987 | Sedillo et al. | 523/130 |
| 4,664,839 A * | 5/1987 | Rieck | 252/175 |
| 4,674,574 A | 6/1987 | Savoly et al. | 166/293 |
| 4,740,319 A | 4/1988 | Patel et al. | 252/8.515 |
| 4,741,843 A | 5/1988 | Garvey et al. | |
| 4,757,862 A | 7/1988 | Naiman et al. | |
| 4,773,481 A | 9/1988 | Allison et al. | 166/270 |
| 4,792,412 A * | 12/1988 | Heilweil | 507/123 |
| 4,825,950 A | 5/1989 | Kalpakci et al. | 166/270.1 |
| 4,891,223 A | 1/1990 | Ambegaonkar et al. | 424/408 |
| 4,941,981 A | 7/1990 | Perricone et al. | |

(Continued)

FOREIGN PATENT DOCUMENTS

| EP | 0 188 856 | 7/1986 |
|---|---|---|
| EP | 0 668 339 A1 | 8/1995 |

(Continued)

OTHER PUBLICATIONS

VIVIPRINT: Products for Digital Printing & imaging; International Specialty Products; pp. 1-11; 2006.*

(Continued)

Primary Examiner — John J Figueroa
(74) Attorney, Agent, or Firm — Craig W. Roddy; McDermott Will & Emery LLP

(57) ABSTRACT

Additives and treatment fluids with improved shale inhibition, and associated methods of use in subterranean operations, are provided. The additives and treatment fluids used generally comprise a shale-inhibiting component and one or more silicates.

16 Claims, No Drawings

U.S. PATENT DOCUMENTS

| | | | | |
|---|---|---|---|---|
| 4,951,921 A | 8/1990 | Stahl et al. | | 166/270 |
| 4,988,450 A | 1/1991 | Wingrave et al. | | |
| 5,030,366 A | 7/1991 | Wilson et al. | | 507/228 |
| 5,035,812 A | 7/1991 | Aignesberger et al. | | |
| 5,039,433 A | 8/1991 | Sopko et al. | | 507/226 |
| 5,080,809 A | 1/1992 | Stahl et al. | | 507/221 |
| 5,111,886 A | 5/1992 | Dovan et al. | | 166/300 |
| 5,161,615 A | 11/1992 | Hutchins et al. | | 166/295 |
| 5,186,257 A | 2/1993 | Stahl et al. | | 166/270.1 |
| 5,196,143 A | 3/1993 | Burba, III et al. | | |
| 5,198,415 A | 3/1993 | Steiger | | |
| 5,208,216 A | 5/1993 | Williamson et al. | | |
| 5,211,250 A | 5/1993 | Kubena, Jr. et al. | | |
| 5,226,480 A | 7/1993 | Dovan et al. | | 166/300 |
| 5,291,949 A | 3/1994 | Dovan et al. | | 166/295 |
| 5,346,550 A | 9/1994 | Kunzi et al. | | 106/709 |
| 5,382,371 A | 1/1995 | Stahl et al. | | 507/221 |
| 5,383,521 A | 1/1995 | Onan et al. | | 166/293 |
| 5,447,198 A | 9/1995 | Kunzi et al. | | 166/293 |
| 5,458,195 A | 10/1995 | Totten et al. | | 166/293 |
| 5,472,051 A | 12/1995 | Brothers | | 166/293 |
| 5,536,311 A | 7/1996 | Rodrigues | | 106/724 |
| 5,569,324 A | 10/1996 | Totten et al. | | 106/696 |
| 5,620,947 A | 4/1997 | Elward-Berry | | 507/229 |
| 5,634,984 A | 6/1997 | Van Slyke | | 134/40 |
| 5,635,458 A | 6/1997 | Le et al. | | |
| 5,654,261 A | 8/1997 | Smith | | |
| 5,662,168 A | 9/1997 | Smith | | 166/295 |
| 5,708,107 A | 1/1998 | Ahmed et al. | | 526/263 |
| 5,711,376 A | 1/1998 | Sydansk | | 166/308.6 |
| 5,723,423 A | 3/1998 | Van Slyke | | 510/188 |
| 5,780,407 A | 7/1998 | Van Slyke | | 510/188 |
| 5,783,527 A | 7/1998 | Dobson et al. | | |
| 5,788,781 A | 8/1998 | Van Slyke | | 134/40 |
| 5,855,244 A | 1/1999 | Ahmed et al. | | 166/295 |
| 5,866,517 A | 2/1999 | Carpenter et al. | | 507/226 |
| 5,874,111 A | 2/1999 | Maitra et al. | | 424/499 |
| 5,883,210 A | 3/1999 | Ahmed et al. | | 526/263 |
| 5,913,364 A | 6/1999 | Sweatman | | 166/281 |
| 5,922,653 A | 7/1999 | Ahmed et al. | | 507/242 |
| 5,945,387 A * | 8/1999 | Chatterji et al. | | 507/224 |
| 5,968,879 A | 10/1999 | Onan et al. | | 507/202 |
| 6,012,524 A | 1/2000 | Chatterji et al. | | 166/295 |
| 6,030,928 A | 2/2000 | Stahl et al. | | 507/121 |
| 6,051,670 A | 4/2000 | Ahmed et al. | | 526/263 |
| 6,054,416 A | 4/2000 | Bland | | |
| 6,059,035 A | 5/2000 | Chatterji et al. | | |
| 6,060,434 A | 5/2000 | Sweatman et al. | | 507/216 |
| 6,090,762 A | 7/2000 | Clapperton et al. | | 510/108 |
| 6,167,967 B1 | 1/2001 | Sweatman | | 166/281 |
| 6,176,315 B1 | 1/2001 | Reddy et al. | | 166/295 |
| 6,177,396 B1 | 1/2001 | Clapperton et al. | | 510/405 |
| 6,180,689 B1 | 1/2001 | Moulin | | |
| 6,196,317 B1 | 3/2001 | Hardy | | 166/295 |
| 6,204,224 B1 | 3/2001 | Quintero et al. | | |
| 6,248,698 B1 | 6/2001 | Mullen et al. | | |
| 6,257,335 B1 * | 7/2001 | Nguyen et al. | | 166/280.2 |
| 6,291,405 B1 | 9/2001 | Lee et al. | | |
| 6,364,016 B1 | 4/2002 | Dalrymple et al. | | 166/270 |
| 6,380,136 B1 | 4/2002 | Bates et al. | | 507/90 |
| 6,419,981 B1 | 7/2002 | Novich et al. | | 427/180 |
| 6,422,325 B1 | 7/2002 | Krieger | | 175/50 |
| 6,423,517 B2 | 7/2002 | Becker et al. | | 435/187 |
| 6,431,280 B2 | 8/2002 | Bayliss et al. | | |
| 6,435,276 B1 | 8/2002 | Kercheville et al. | | |
| 6,451,743 B1 | 9/2002 | Fox | | 507/110 |
| 6,497,283 B1 | 12/2002 | Eoff et al. | | 166/293 |
| 6,497,383 B1 | 12/2002 | Daul et al. | | |
| 6,579,832 B2 | 6/2003 | Jimenez et al. | | 507/143 |
| 6,586,371 B1 | 7/2003 | Maroy et al. | | 507/120 |
| 6,610,810 B2 | 8/2003 | Phillips et al. | | 527/201 |
| 6,642,183 B1 | 11/2003 | Bass et al. | | 507/129 |
| 6,656,266 B1 * | 12/2003 | Barlet-Gouedard et al. | | 106/802 |
| 6,656,989 B1 | 12/2003 | Benton et al. | | 524/394 |
| 6,702,044 B2 | 3/2004 | Reddy et al. | | 175/64 |
| 6,703,351 B2 | 3/2004 | Stowe, II et al. | | 507/117 |
| 6,716,799 B1 | 4/2004 | Mueller et al. | | |
| 6,743,288 B2 | 6/2004 | Eoff et al. | | 106/724 |
| 6,770,604 B2 | 8/2004 | Reddy et al. | | 507/224 |
| 6,822,061 B2 | 11/2004 | Eoff et al. | | 526/287 |
| 6,823,940 B2 | 11/2004 | Reddy et al. | | 166/295 |
| 6,837,316 B2 | 1/2005 | Reddy et al. | | 175/64 |
| 6,838,082 B2 | 1/2005 | Growcock et al. | | |
| 6,838,417 B2 | 1/2005 | Bouwmeester et al. | | 507/203 |
| 6,843,841 B2 | 1/2005 | Reddy et al. | | 106/162.2 |
| 6,861,393 B2 | 3/2005 | Temple et al. | | 507/119 |
| 6,877,563 B2 | 4/2005 | Todd et al. | | 166/312 |
| 6,955,220 B2 | 10/2005 | Maberry et al. | | |
| 7,032,669 B2 | 4/2006 | Chatterji et al. | | 166/300 |
| 7,033,975 B2 | 4/2006 | Baran, Jr. et al. | | 507/102 |
| 7,087,554 B2 * | 8/2006 | Youngson et al. | | 507/123 |
| 7,276,249 B2 * | 10/2007 | Ryde et al. | | 424/451 |
| 7,320,802 B2 | 1/2008 | Ryde et al. | | |
| 7,348,365 B2 * | 3/2008 | Lee et al. | | 516/78 |
| 7,786,049 B2 * | 8/2010 | Temple et al. | | 507/123 |
| 7,833,945 B2 * | 11/2010 | Harrower et al. | | 507/123 |
| 2002/0065208 A1 * | 5/2002 | Aubay et al. | | 510/475 |
| 2002/0123433 A1 * | 9/2002 | Goodhue et al. | | 507/140 |
| 2002/0149002 A1 * | 10/2002 | Womelsdorf et al. | | 252/363.5 |
| 2002/0149656 A1 | 10/2002 | Nohr et al. | | 347/95 |
| 2002/0160919 A1 | 10/2002 | Stowe, II et al. | | |
| 2003/0008778 A1 | 1/2003 | Donaldson et al. | | 507/100 |
| 2003/0064897 A1 | 4/2003 | Kirsner et al. | | 507/100 |
| 2003/0114317 A1 | 6/2003 | Benton et al. | | 507/200 |
| 2003/6144153 | 7/2003 | Kirsner et al. | | 507/100 |
| 2003/0234103 A1 | 12/2003 | Lee et al. | | |
| 2004/0043905 A1 | 3/2004 | Miller et al. | | 507/100 |
| 2004/0110644 A1 | 6/2004 | Halliday et al. | | 507/100 |
| 2004/0132625 A1 | 7/2004 | Halliday et al. | | 507/100 |
| 2004/0204323 A1 * | 10/2004 | Temple et al. | | 507/100 |
| 2004/0229755 A1 | 11/2004 | Thaemlitz | | |
| 2004/0235674 A1 | 11/2004 | Youngson et al. | | |
| 2005/0006305 A1 | 1/2005 | Juby et al. | | |
| 2005/0032652 A1 | 2/2005 | Kirsner et al. | | 507/100 |
| 2006/0116294 A1 | 6/2006 | Xiang et al. | | 507/117 |
| 2006/0231255 A1 | 10/2006 | Oyler et al. | | 166/295 |
| 2006/0234875 A1 | 10/2006 | Oyler et al. | | 507/219 |

FOREIGN PATENT DOCUMENTS

| | | |
|---|---|---|
| GB | 1082046 | 9/1967 |
| GB | 2 267 921 A | 12/1993 |
| WO | WO 96/03474 A2 | 2/1996 |
| WO | WO 96/04348 | 2/1996 |
| WO | WO96/04348 A1 | 2/1996 |
| WO | WO 97/05212 | 2/1997 |
| WO | WO02/087749 A1 | 11/2002 |
| WO | WO 2004/090067 A2 | 10/2004 |
| WO | WO 2005/078047 A1 | 8/2005 |
| WO | WO 2006/111703 | 10/2006 |
| WO | WO 2007/010212 | 1/2007 |

OTHER PUBLICATIONS

David K. Hood et al., Structural Insights into a Novel Molecular-Scale Composite of Soluble Poly(vinyl pyrrlidone) Supporting Uniformly Dispersed Nanoscale Poly(viyl pyrrolidone) Particles; Journal of Applied Polymer Science, vol. 89, 734-741 (2003).*

Office Action from U.S. Appl. No. 10/411,015, Nov. 1, 2005.

Office Action from U.S. Appl. No. 10/411,015, Apr. 20, 2005.

Office Action from U.S. Appl. No. 11/109,354, Mar. 8, 2007.

Office Action from U.S. Appl. No. 11/109,354, Aug. 29, 2006.

Office Action from U.S. Appl. No. 10/776,887, Mar. 5, 2007.

Office Action from U.S. Appl. No. 10/776,887, Sep. 6, 2006.

Office Action from U.S. Appl. No. 10/776,887, May 22, 2006.

Office Action from U.S. Appl. No. 11/109,150, Mar. 29, 2007.

Halliburton brochure entitled "Accolade Drilling Fluid Exceeds New GOM Environmental Standards and Boosts Performance", Apr. 2002.

Baker Hughes Drilling Fluids, "Water Based Fluids: MAX-SHIELD," available at http://www.bakerhughes.com/DrillingFluids/water_based_fluids/maxshield.htm, 2006.

Baker Hughes Drilling Fluids, "Safety Data Sheet: MAX-SHIELD", Oct. 27, 2004.

Dye, Billy at al., "Design Considerations for High Performance Water-Based Muds," *American Association of Drilling Engineers*, AADE-04-DF-HO-14, Apr. 2004.

Baker Hughes Drilling Fluids, Material Safety Data Sheet: PERFORMAX™, Nov. 13, 2003.
U.S. Appl. No. 11/183,122, filed Jul. 15, 2005, Youngson et al.
U.S. Appl. No. 11/109,150, filed Apr. 19, 2005, Oyler et al.
U.S. Appl. No. 11/109,354, filed Apr. 19, 2005, Oyler et al.
Nesbitt, L.E. et al., "Shale Stabilization Principles" SPE 14248, dated 1985.
Baroid brochure entitled "BARACAT® Shale Stabilizer" dated 2002.
Baroid brochure entitled "BARASIL™-S Shale Stabilizer" dated 2002.
Baroid brochure entitled "BARO-TROL® PLUS Shale Stabilizer" dated 2000.
Baroid brochure entitled "CLAYSEAL® Shale Stabilizer" dated 2002.
Baroid brochure entitled "EZ-MUD® Shale Stabilizer" dated 2002.
Baroid brochure entitled "GEM™ 2000 Shale Stabilizer" dated 2202.
Baroid brochure entitled "HYDRO-GUARD™ Inhibitive Water-Based Fluid" dated 2002.
Hood, David et al., "Structural Insights into a Novel Molecular-Scale Composite of Soluble Poly(vinyl pyrrolidone) Supporting Uniformly Dispersed Nanoscale . . . " dated 2002.
International Specialty Products brochure entitled "New ViviPrint™ Technology Commercially Available" dated 2002.
Zyvex brochure entitled "Nanotechnology" dated 2003.
Kodak brochure entitled "Nanoparticles and You" dated 2003.
Poehlein, Gary "Connections to Other Fields; Education Issues" dated 1998.
Harrower, Elaine et al., "Treatment Fluids With Improved Shale Inhibition and Methods of Use in Subterranean Operations" filed Jul. 15, 2005 as U.S. Appl. No. 11/183,122.
Foreign Communication from a Related Counterpart Application—PCT/GB2005/000411, Jun. 1, 2005.
Foreign Communication from a Related Counterpart Application—PCT/GB2005/000411, Aug. 14, 2006.
Foreign Communication from a Related Counterpart Application—PCT/GB2004/001563, Dec. 21, 2004.
Foreign Communication from a Related Counterpart Application—PCT/GB2004/001563, Sep. 13, 2004.
Foreign Communication from a Related Counterpart Application—PCT/GB2006/002622, Sep. 25, 2006.
Foreign Communication from a Related Counterpart Application—PCT/GB2006/002622, Jan. 16, 2008.
Foreign Communication from a Related Counterpart Application—EP 05 702 136.2, May 29, 2007.
Foreign Communication from a Related Counterpart Application—PCT/GB2006/001286, Oct. 23, 2007.
Foreign Communication from a Related Counterpart Application—PCT/GB2006/001286, Jun. 16, 2007.
Foreign Communication from a Related Counterpart Application—PCT/GB2006/001244, Oct. 23, 2007.
Foreign Communication from a Related Counterpart Application—PCT/GB2006/001244, Dec. 28, 2006.
Notice of Allowance from U.S. Appl. No. 11/411,015, filed Apr. 21, 2006.
Office Action from U.S. Appl. No. 11/183,122, filed Feb. 6, 2008.
Office Action from U.S. Appl. No. 11/109,150, filed Sep. 21, 2007.
Office Action from U.S. Appl. No. 11/109,354, filed Dec. 12, 2007.
Office Action from U.S. Appl. No. 11/776,887, filed Feb. 6, 2008.
Office Action from U.S. Appl. No. 11/776,887, filed Aug. 23, 2007.
Office Action from U.S. Appl. No. 11/109,354, filed Mar. 8, 2007.
Office Action dated Jun. 9, 2008 from U.S. Appl. No. 11/109,150.
Office Action mailed Jul. 29, 2008 from U.S. Appl. No. 11/109,354.
Office Action mailed Aug. 11, 2008 from U.S. Appl. No. 10/776,887.
Office Action dated Oct. 30, 2008, for U.S. Appl. No. 11/183,122.
Office Action for U.S. Appl. No. 11/109,150, dated Feb. 19, 2009.

* cited by examiner

TREATMENT FLUIDS WITH IMPROVED SHALE INHIBITION AND METHODS OF USE IN SUBTERRANEAN OPERATIONS

CROSS-REFERENCE TO RELATED APPLICATIONS

This application is related to co-pending U.S. patent application Ser. No. 11/183,122, entitled "Treatment Fluids with Improved Shale Inhibition and Methods of Use in Subterranean Operations," filed on the same day herewith, the entirety of which is herein incorporated by reference.

BACKGROUND

The present invention relates to fluids and compositions useful in subterranean operations, and more particularly, to additives and treatment fluids with improved shale inhibition, and associated methods of use.

A treatment fluid may be used in a variety of subterranean operations. As used herein, the term "subterranean operation" is defined to mean any operation that requires the performance of some action or procedure below the surface of the earth, including, but not limited to, actions or procedures performed in the course of recovering oil, gas, and/or other substances from a formation below the surface of the earth. Such subterranean operations also include, but are not limited to, service line and tunneling operations. As used herein, the term "treatment," or "treating," does not imply any particular action by the fluid or any particular component thereof, but instead refers to any use related to a subterranean operation in conjunction with a desired function and/or for a desired purpose. For example, a fluid may be used to drill a well bore in a subterranean formation or to complete a well bore in a subterranean formation, as well as numerous other purposes.

Drilling operations may involve any number of different techniques known and practiced in the art. In the most basic sense, rotary drilling operations typically involve attaching a drill bit on a lower end of a drillstring to form a drilling tool and rotating the drill bit along with the drillstring into a subterranean formation to create a well bore through which subsurface formation fluids may be recovered. In another method of drilling, coiled tubing may be used instead of jointed pipe and the drill bit may be rotated using a downhole motor. The process of drilling a well bore typically requires the use of a drilling fluid. Drilling fluids are used, inter alia, to cool the drill bit, lubricate the rotating drill pipe to prevent it from sticking to the walls of the well bore, prevent blowouts by serving as a hydrostatic head to counteract the sudden entrance into the well bore of high pressure formation fluids, and remove drill cuttings from the well bore. A drilling fluid used in connection with drilling a well in a subterranean formation may be any fluid substance (gaseous or liquid) or a mixture of fluids and solids (such as solid suspensions, mixtures and emulsions of liquids, gases and solids).

During drilling of subterranean well bores, it is not uncommon to encounter various strata that comprise reactive shales. As used herein, the term "shale" is defined to mean materials that may "swell," or increase in volume, when exposed to water. Examples of these shales include certain types of clays (for example, bentonite). Reactive shales may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface.

Shale disintegration also may impact "equivalent circulating density" ("ECD"). ECD may be affected by the solids content of the drilling fluid, which may increase if surface solids control equipment cannot remove shale from the drilling fluid. Plastic viscosity (an indicator of size and quantity of solids) is an important parameter that affects drilling rate. Maintenance of appropriate ECD is important in drilling a well bore where a narrow tolerance exists between the weight of the drilling fluid needed to control the formation pressure and the weight of the drilling fluid that will fracture the formation. In such circumstances, minimizing shale degradation may be desirable, inter alia, to control of the viscosity of the drilling fluid. Moreover, degradation of drilled cuttings prior to their removal at the surface may prolong drilling time because shale particles traveling up the well bore can break up into smaller and smaller particles, which can expose new surface area of the shale particles to the drilling fluid and lead to further absorption of water and degradation.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such an extent that the well bore collapses. Degradation of the shale also may interrupt circulation of the drilling fluid, cause greater friction between the drill string and the well bore, and/or cause the drill string to become stuck in the well bore. Accordingly, the complications associated with shale swelling during drilling may substantially increase the time and cost of drilling.

A traditional method of inhibiting shale swelling during drilling to attempt to minimize such complications has been to use an oil-based drilling fluid as opposed to an aqueous-based drilling fluid. However, environmental regulations enacted by numerous countries have limited the use of oil-based drilling fluids.

Another conventional technique used to counteract the propensity of aqueous drilling fluids to interact with reactive shales in a formation involves adding a shale-inhibiting component to the aqueous drilling fluid. As used herein, the term "shale-inhibiting component" refers to a compound that demonstrates a propensity for inhibiting the tendency of shale to absorb water. Amphoteric materials (i.e., substances that may exhibit both acidic and/or alkaline properties) are one type of water-based shale inhibitor that has been used in the past. Amphoteric materials are believed to attach to the shale substrate, thus preventing water ingress. However, amphoteric inhibitors may be environmentally undesirable, especially in heavily regulated areas, because they typically demonstrate low biodegradability and high toxicity. Potassium chloride is another conventional shale-inhibiting component. Although potassium chloride is widely used as a shale inhibitor in the North Sea, it is considered to be only moderately effective at inhibiting shale swelling. Furthermore, potassium chloride can be environmentally unacceptable in other areas of the world, for example, regions such as around the Gulf of Mexico, because its concentration of potassium ions may harm certain types of marine life. Potassium chloride is also disfavored in regions such as the Middle East where wells are drilled in close proximity to aquifers due to concerns that the potassium chloride will contaminate the aquifer. Polyglycols have also been used as shale inhibitors in water-based drilling fluids, but have not demonstrated satisfactory inhibition levels. Partially hydrolyzed polyacrylamides ("PHPA") have also been utilized in many regions, but these have been found to have undesirable properties in certain circumstances.

Drilling fluids containing silicates are used in the art to manage shale reactivity with aqueous-based drilling fluids. However, silicates do not provide the desired lubricity (i.e., the ability to lubricate equipment used in a drilling operation) for subterranean drilling operations, nor do they effectively reduce the accumulation of shale on equipment that comes into contact with those shales encountered in a well bore. Drilling fluids containing nanoparticles are also used in the art to manage shale reactivity with aqueous-based drilling fluids by, inter alia, providing lubricity and preventing the accretion of shale on drilling equipment. However, these nanoparticles generally do not impart increased hardness to the shale, a property that may facilitate the removal of shale particles from a well bore and/or circulated drilling fluid.

SUMMARY

The present invention relates to fluids and compositions useful in subterranean operations, and more particularly, to additives and treatment fluids with improved shale inhibition, and associated methods of use.

In one embodiment, the present invention provides a method comprising: providing a treatment fluid that comprises an aqueous base fluid, a shale-inhibiting component that comprises a nanoparticle source and/or a heterocyclic compound comprising nitrogen, and one or more silicates; and placing the treatment fluid in a subterranean formation.

In another embodiment, the present invention provides a method of drilling in a subterranean formation, the method comprising: providing a drilling fluid comprising an aqueous base fluid, a shale-inhibiting component that comprises a nanoparticle source and/or a heterocyclic compound comprising nitrogen, and one or more silicates; and using the drilling fluid to drill in at least a portion of the subterranean formation.

In another embodiment, the present invention provides a method of enhancing the shale inhibition of a treatment fluid that comprises an aqueous base fluid, the method comprising: contacting the treatment fluid with a shale-inhibiting component that comprises a nanoparticle source and/or a heterocyclic compound comprising nitrogen; and contacting the treatment fluid with one or more silicates.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to fluids and compositions useful in subterranean operations, and more particularly, to additives and treatment fluids with improved shale inhibition, and associated methods of use.

The additives and treatment fluids of the present invention generally comprise a shale-inhibiting component and one or more silicates. The shale-inhibiting components utilized in the present invention comprise a nanoparticle source and/or one or more heterocyclic compounds comprising nitrogen. The shale-inhibiting component and silicates, among other things, may provide improved shale inhibition in well bores comprising shale and/or measurably improve the lubricity of treatment fluids to which they are added. As a result, reduced amounts of lubricants, viscosifiers, and other additives may be needed in treatment fluids and methods of the present invention.

As used herein, the term "nanoparticle source" is defined to include any substance that comprises a polymeric material comprising at least a plurality of nanoparticles having diameters in at least one dimension in the range of 1 up to about 1000 nanometers. In certain embodiments, at least a portion of the nanoparticle source comprises nanoparticles having an average particle size of less than about 400 nanometers. In certain embodiments, the nanoparticle source may comprise crosslinked polymers. In certain embodiments, the nanoparticle source may comprise a heterocyclic compound comprising nitrogen. In certain embodiments, the heterocyclic compound comprising nitrogen may comprise polyvinyl pyrrolidone. An example of a suitable nanoparticle source comprising polyvinyl pyrrolidone is commercially available under the tradename "VIVIPRINT 540" from International Specialty Products of Wayne, N.J. On information and belief, VIVIPRINT 540 comprises water and about 11% crosslinked polyvinyl pyrrolidone by weight, and at least a portion of the polyvinyl pyrrolidone is in the form of nanoparticles. In certain embodiments, the nanoparticle source may comprise rubber latex, and at least a portion of the rubber latex is in the form of nanoparticles. One of ordinary skill in the art will recognize the suitability of a nanoparticle source comprising rubber latex where use of a drilling fluid may be subject to environmental restrictions, and should make appropriate adjustments to the compositions or methods of the present invention. A variety of nanoparticle sources comprising rubber latex may be used in accordance with the present invention, including both synthetic and natural rubbers in latex form, where such rubber latexes are commercially available as aqueous dispersions and/or emulsions. In some embodiments, the nanoparticle source comprises emulsion-polymerized copolymers of 1,3-butadiene and styrene. An example of a suitable nanoparticle source comprising emulsion-polymerized copolymers of 1,3-butadiene and styrene used in the drilling fluids of the present invention is commercially available under the tradename "TECHWAX FL250" from Techwax, Ltd. of Newton Aycliffe, United Kingdom. TECHWAX FL250 comprises water and about 68% of emulsion-polymerized copolymers of 1,3-butadiene and styrene by weight, and at least a portion of such copolymers is in the form of nanoparticles. In certain embodiments, the nanoparticle source may comprise a combination of any of these polymeric materials. For example, in one embodiment, the nanoparticle source may comprise crosslinked polyvinyl pyrrolidone and emulsion-polymerized copolymers of 1,3-butadiene and styrene.

As used herein, the term "heterocyclic compound comprising nitrogen" refers to any compound whose molecules have a ring structure wherein at least one of the atoms in the ring is a nitrogen atom. In certain embodiments, the heterocyclic compound comprising nitrogen may comprise polyvinyl pyrrolidone. An example of a suitable source of polyvinyl pyrrolidone is commercially available under the tradename "VIVIPRINT 540" from International Specialty Products of Wayne, N.J. On information and belief, VIVIPRINT 540 comprises water and about 11% crosslinked polyvinyl pyrrolidone by weight.

Examples of silicates suitable for use in the additives and treatment fluids of the present invention include, but are not limited to, sodium silicate and potassium silicate. Certain silicates may be incompatible with the additives, treatment fluids, or methods of the present invention in a given application. For example, higher concentrations of sodium silicates may have undesirable effects on the subterranean formation in a given operation. In certain instances, fluids contaminated with carbon dioxide, acidic gases (e.g., hydrogen sulphide), or Zechstein brines (i.e., magnesium chloride brines) may be incompatible with certain types of silicates. One of ordinary skill in the art, with the benefit of this disclosure, will recognize instances where certain silicates would be incompatible with the fluids used and/or circumstances present in a given subterranean operation.

The treatment fluids of the present invention generally comprise an aqueous base fluid, shale-inhibiting component, and one or more silicates. In certain embodiments, a treatment fluid of the present invention may comprise a drilling fluid. In certain embodiments, the treatment fluids of the present invention have a density in the range of from about 7 lbs/gallon to about 22 lbs/gallon.

The aqueous base fluid in the treatment fluids of the present invention may comprise fresh water, salt water (e.g., water containing one or more dissolved salts), brine, seawater, or any combination thereof. One of ordinary skill in the art with the benefit of this disclosure will recognize which types of aqueous base fluids are appropriate for a particular application.

Generally, the shale-inhibiting component is present in the treatment fluids and methods of the present invention in an amount in the range of from 0.5% to about 10% by volume of the treatment fluid. In certain embodiments, the shale-inhibiting component may be present in the treatment fluids and methods of the present invention in an amount in the range of from 2.5% to about 6% by volume of the treatment fluid. Generally, the silicates are present in the treatment fluids and methods of the present invention in an amount in the range of from 0.5% to about 15% by volume of the treatment fluid. In certain embodiments, the silicates may be present in the treatment fluids and methods of the present invention in an amount in the range of from 2.5% to about 6% by volume of the treatment fluid. One of ordinary skill in the art, with the benefit of this disclosure, will recognize the appropriate amount of silicates and the shale-inhibiting component for a given application depending on, among other things, the reactivity of the subterranean formation and/or the particular type of shale encountered.

The additives, treatment fluids, and methods of the present invention may be utilized in subterranean operations comprising temperatures ranging to about 400° F., due to, inter alia, their temperature stability across a broad range of temperatures.

Optionally, the treatment fluids of the present invention may contain one or more salts, inter alia, to provide the desired density to the treatment fluid. One of ordinary skill in the art, with the benefit of this disclosure, will recognize the need for caution when combining a salt with a treatment fluid for use in certain regions of the world where such use of a salt may be subject to environmental restrictions. One of ordinary skill in the art will also recognize where it is desirable to use a dense brine rather than, among other things, a solid weighting agent. Where the use of a salt is permissible, a variety of salts may be used. Examples of suitable salts include, but are not limited to, potassium chloride, sodium chloride, potassium formate, potassium carbonate, calcium chloride, and calcium bromide. In certain embodiments, a mixture of suitable salts may be used. In certain embodiments, the salts may be present in the treatment fluids of the present invention in an amount in the range of from about 5 pounds per barrel to about the salt saturation limit of the treatment fluid.

Other additives suitable for use in subterranean operations also may be present in the treatment fluids of the present invention if desired, including, among other things, antifoam agents, biocides, bridging agents, corrosion inhibitors, dispersants, flocculants, fluid loss additives, foamers, defoamers, gases, $H_2S$ scavengers, $CO_2$ scavengers, oxygen scavengers, scale inhibitors, lubricants, viscosifiers, weighting agents, and the like. One of ordinary skill in the art with the benefit of this disclosure will be able to determine if any of these such additives are desired for a given application, as well as the appropriate amount of such additives to include.

In certain embodiments, the methods of the present invention comprise providing a treatment fluid (e.g., a drilling fluid) of the present invention that comprises an aqueous base fluid, a shale-inhibiting component that comprises a nanoparticle source and/or a heterocyclic compound comprising nitrogen, and one or more silicates; and placing the treatment fluid in a subterranean formation. In some embodiments, the methods of the present invention comprise adding a shale-inhibiting component that comprises a nanoparticle source and/or a heterocyclic compound comprising nitrogen, and one or more silicates to a treatment fluid (e.g., a drilling fluid) that comprises an aqueous base fluid. The shale-inhibiting component and silicates may be added to the treatment fluid individually or as a pre-mixed additive that comprises the shale-inhibiting component and/or one or more silicates, as well as other optional components. The shale-inhibiting component and/or silicates may be added to the treatment fluid prior to, during, or subsequent to placing the treatment fluid in the subterranean formation.

The methods of the present invention may be utilized in a variety of subterranean operations that involve subterranean drilling. Examples of suitable subterranean drilling operations include, but are not limited to, water well drilling, oil/gas well drilling, utilities drilling, tunneling, construction/installation of subterranean pipelines and service lines, and the like. These subterranean drilling operations may be utilized, inter alia, to drill a well bore in a subterranean formation, or to stimulate the production of fluids from a subterranean formation, as well as or for a number of other purposes. In certain embodiments, the present invention provides methods of drilling at least a portion of a well bore to penetrate a subterranean formation. In those embodiments, a drilling fluid may be placed in contact with a drill bit and a subterranean formation. In certain embodiments of the present invention, the drilling fluid may comprise the shale-inhibiting component and/or one or more silicates before it is introduced into the well bore. In other embodiments, the shale-inhibiting component and/or silicates may be added to a drilling fluid that comprises an aqueous base fluid already resident within the well bore.

To facilitate a better understanding of the present invention, the following examples of certain aspects of some embodiments are given. In no way should the following examples be read to limit, or define, the scope of the invention.

EXAMPLE 1

A shale recovery test was performed on two samples of different treatment fluids of the present invention in order to determine whether those treatment fluids exhibit inhibition towards samples of London clay. This test was intended to mimic the exposure of drilled cuttings to a drilling fluid during transport to the surface through a well bore annulus.

A sample of dried London clay was ground and sieved through a 4 mm sieve and collected on a 2 mm sieve. Ground clay particles that passed through the 4 mm sieve but collected on the 2 mm sieve, e.g., clay particles that were sized less than 4 mm but greater than 2 mm, were selected for use in this particular test. For each fluid to be tested, a 20 gram sample of sized clay was weighed and selected.

Next, approximately 350 mL of each fluid to be tested was poured into a bottle. The 20 gram sized clay sample was added to the fluid, and the bottle was capped and shaken to ensure even distribution. The sample was then placed in an oven and hot rolled at 160° F. for 16 hours. When the 16 hour hot roll was complete, the sample was cooled to room temperature.

Next, a large quantity of approximately 20 ppb potassium chloride solution was prepared. The contents of the sample bottle were then poured onto a 500 micrometer sieve. The inside of the sample bottle was carefully rinsed with the potassium chloride solution, and once more poured onto the 500 micrometer sieve. The bottle was repeatedly rinsed and poured until all clay was removed from the bottle.

Next, the clay retained by the 500 micrometer sieve was carefully washed with the potassium chloride solution. Special care was taken to ensure that none of the sample spilled over the side of the sieve. The washed particles of clay were then washed with water to remove any remnants of the potassium chloride brine. A clean, dry piece of non-absorbent paper was placed on a flat surface, and the 500 micrometer sieve was turned upside down above it. The sieve was tapped to remove the washed particles of clay. A brush was used to remove any clay particles left on the sieve.

The sample was then placed in a pre-weighed Petri dish and transferred to a pre-heated oven at 250° F. to dry to a constant weight. Having dried, the clay sample was then weighed. The percentage recovery of clay for each fluid tested was then determined by the following calculation:

$$\text{Percent Clay Recovered} = \frac{(\text{weight in grams of dried clay recovered})}{20 \text{ grams}} \times 100$$

where the "20 grams" in the denominator refers to the weight of the original clay sample. Table 1 below lists the percentage of clay recovered for each fluid tested.

TABLE 1

| Fluid Description | Percent Clay Recovered |
|---|---|
| Fluid Sample No. 1 | 100 |
| Fluid Sample No. 2 | 100 |

Fluid Sample No. 1 is a treatment fluid of the present invention comprising an aqueous solution of water, 3% v/v polyvinyl pyrrolidone comprising nanoparticles, and 4% v/v potassium silicate. Fluid Sample No. 2 is a treatment fluid of the present invention comprising an aqueous solution of water, 2% v/v polyvinyl pyrrolidone comprising nanoparticles, and 4% v/v potassium silicate.

The shale recovery for each of the samples of treatment fluids of the present invention was 100%. Thus Example 1 illustrates, inter alia, that the treatment fluids of the present invention demonstrate good shale inhibition.

EXAMPLE 2

A bulk hardness test was performed on samples of different treatment fluids using samples of London clay. This test was intended to mimic the exposure of drilled cuttings to a drilling fluid during transport to the surface through a well bore annulus.

A sample of dried London clay was ground and sieved through a 4 mm sieve and collected on a 2 mm sieve. Ground clay particles that passed through the 4 mm sieve but collected on the 2 mm sieve, e.g., clay particles that were sized less than 4 mm but greater than 2 mm, were selected for use in this particular test.

A 100 gram sample of the sized clay particles was placed in each bottle and immersed in a 350 mL sample of each treatment fluid tested. Each bottle was capped and shaken to ensure even distribution. The sample was then placed in an oven at 160° F. for 16 hours, at which point the sample was cooled to room temperature.

Next, a large quantity of approximately 20 ppb potassium chloride solution was prepared. The contents of the sample bottle were then poured onto a 500 micrometer sieve and washed with the potassium chloride solution.

The bulk hardness of the washed clay particles was then tested with a bulk hardness tester, which comprises a cylindrical chamber on top of a plate with 2 mm perforations, and a plunger on the top of the cylinder that can be threaded down into the chamber using a torque wrench. The washed clay particles were loaded into the cylindrical chamber, the plunger was attached to the top of the cylinder, and a torque wrench was fitted onto the plunger. The wrench was turned as the torque required for each revolution was recorded. Table 2 below lists the average of the torque required in the thirteenth, fourteenth, and fifteenth turns in compressing each of the clay samples immersed in the fluid samples tested.

TABLE 2

| Fluid Description | Torque (lb) |
|---|---|
| Fluid Sample No. 3 | 583 |
| Fluid Sample No. 4 | 523 |
| Fluid Sample No. 5 | 150 |

Fluid Sample No. 3 is a treatment fluid of the present invention comprising an aqueous solution of water, 3% v/v polyvinyl pyrrolidone comprising nanoparticles, and 4% v/v potassium silicate. Fluid Sample No. 4 is a treatment fluid of the present invention comprising an aqueous solution of water, 2% v/v polyvinyl pyrrolidone comprising nanoparticles, and 4% v/v potassium silicate. Fluid Sample No. 5 comprises 3% v/v polyvinyl pyrrolidone comprising nanoparticles and 50 ppb potassium chloride.

Thus Example 2 illustrates, inter alia, that the treatment fluids of the present invention demonstrate the ability to impart improved hardness properties to clay particles with which they come into contact, as compared with at least one other type of treatment fluid.

EXAMPLE 3

A second bulk hardness test was performed on samples of different treatment fluids using samples of Foss Eikland clay. The test was conducted according to the procedure described in Example 2 above. Table 3 below lists the average of the torque required in the thirteenth, fourteenth, and fifteenth turns in compressing each of the clay samples immersed in the fluid samples tested.

TABLE 3

| Fluid Description | Torque (lb) |
| --- | --- |
| Fluid Sample No. 6 | 600 |
| Fluid Sample No. 7 | 600 |
| Fluid Sample No. 8 | 32 |

Fluid Sample No. 6 is a treatment fluid of the present invention comprising an aqueous solution of water, 3% v/v polyvinyl pyrrolidone comprising nanoparticles, and 4% v/v potassium silicate. Fluid Sample No. 7 is a treatment fluid of the present invention comprising an aqueous solution of water, 2% v/v polyvinyl pyrrolidone comprising nanoparticles, and 4% v/v potassium silicate. Fluid Sample No. 8 comprises 3% v/v polyvinyl pyrrolidone comprising nanoparticles and 40 ppb potassium chloride.

Thus Example 3 illustrates, inter alia, that the treatment fluids of the present invention demonstrate the ability to impart improved hardness properties to clay particles with which they come into contact, as compared with at least one other type of treatment fluid.

EXAMPLE 4

A third bulk hardness test was performed on samples of different treatment fluids using samples of London clay. The test was conducted according to the procedure described in Example 2 above. Table 4 below lists the average of the torque required in the thirteenth, fourteenth, and fifteenth turns in compressing each of the clay samples immersed in the fluid samples tested.

TABLE 4

| Fluid Description | Torque (lb) |
| --- | --- |
| Fluid Sample No. 9 | 60 |
| Fluid Sample No. 10 | 50 |
| Fluid Sample No. 11 | 587 |
| Fluid Sample No. 12 | 600 |

Fluid Sample No. 9 comprises an aqueous solution of water and 46 lb/bbl potassium chloride. Fluid Sample No. 10 comprises an aqueous solution of water and 51 lb/bbl potassium formate. Fluid Sample No. 11 comprises an aqueous solution of water and 12% v/v potassium silicate. Fluid Sample No. 12 is a treatment fluid of the present invention comprising an aqueous solution of water, 3% v/v polyvinyl pyrrolidone comprising nanoparticles, and 4% v/v potassium silicate.

Thus Example 4 illustrates, inter alia, that the treatment fluids of the present invention demonstrate the ability to impart improved hardness properties to clay particles with which they come into contact, as compared with certain other types of treatment fluid.

EXAMPLE 5

A lubricity test was performed on samples of different treatment fluids to determine the lubricity of the treatment fluids of the present invention as compared with other types of treatment fluids. In this test, the coefficients of friction for samples of five different treatment fluids were determined using a Model 212 EP (extreme pressure) lubricity tester manufactured by the Fann Company. A reduction in coefficient of friction generally indicates a fluid having increased lubricity.

First, the correction factor for the lubricity tester was determined using a sample of deionized water. The lubricity test block was placed in the block holder with the indentation on the far left. The stainless steel sample cup was filled with deionized water and placed on the stand. Next, the stand was raised until the test ring was submerged in the water and secured with a thumb screw. The arm of the torque arm was then positioned to fit inside the concave portion of the torque arm clamp, the torque adjust handle was turned to ensure that there was no force on the block, and the torque meter was set to zero. The tester was run at 60 rpm for approximately 5 minutes. Next, the torque adjust handle was rotated to apply 150 inch-pounds of torque, and the tester was run for approximately 5 minutes. Then, the torque meter reading was recorded. The torque meter reading for deionized water should be 34 plus or minus 8. The correction factor is then obtained by dividing 34 by the torque meter reading. The calculation is defined as:

$$\text{correction factor} = \frac{34}{\text{torque meter reading for water}}$$

Then, the water was discarded, the equipment was dried, and the lubricity of the sample fluid was measured. The sample fluid was mixed for 10 minutes and placed in the stainless steel sample cup of the tester. The cup was placed on the stand, raised until the test block and ring were submerged in the fluid, and secured with the thumb screw. The torque was set to zero (as previously with the water sample), and the tester was run at 60 rpm for approximately 5 minutes. Next, 150 inch-pounds of torque was applied by rotating the torque adjust handle, and the tester was run for approximately 5 minutes. The torque meter reading was then recorded.

The coefficient of friction for the fluid sample was then determined by the following calculation:

$$\text{Coefficient of friction} = \frac{(\text{torque reading for sample})}{100} \times (\text{correction factor})$$

Table 5 below lists the coefficient of friction for each fluid tested.

TABLE 5

| Fluid Description | Coefficient of Friction |
| --- | --- |
| Fluid Sample No. 13 | 0.18 |
| Fluid Sample No. 14 | 0.24 |
| Fluid Sample No. 15 | 0.41 |
| Fluid Sample No. 16 | 0.14 |
| Fluid Sample No. 17 | 0.14 |

Fluid Sample No. 13 comprises an aqueous solution of water, 46 lb/bbl potassium chloride. Fluid Sample No. 14 comprises an aqueous solution of water, 51 lb/bbl potassium. Fluid Sample No. 15 comprises an aqueous solution of water and 12% v/v potassium silicate. Fluid Sample No. 16 comprises an aqueous solution of water and 3% v/v polyvinyl pyrrolidone comprising nanoparticles. Fluid Sample No. 17 is a treatment fluid of the present invention comprising an aqueous solution of water, 3% v/v polyvinyl pyrrolidone comprising nanoparticles, and 4% v/v potassium silicate.

Thus Example 5 illustrates, inter alia, that the treatment fluids of the present invention demonstrate improved lubricity, as compared with certain other types of treatment fluids.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
   providing a treatment fluid that comprises
      an aqueous base fluid,
      a shale inhibiting component that comprises a nanoparticle source and a heterocyclic compound comprising nitrogen, and
      one or more silicates; and
   placing the treatment fluid in a subterranean formation.

2. The method of claim 1 further comprising recovering the treatment fluid from the subterranean formation.

3. The method of claim 1 wherein the nanoparticle source comprises a plurality of crosslinked polymers.

4. The method of claim 1 wherein at least a portion of the nanoparticle source comprises nanoparticles having an average particle size of less than about 1000 nanometers.

5. The method of claim 1 wherein the shale inhibiting component comprises a nanoparticle source that comprises at least one of the following: a heterocyclic compound that comprises nitrogen; a rubber latex; or a derivative thereof.

6. The method of claim 1 wherein the heterocyclic compound that comprises nitrogen comprises polyvinyl pyrrolidone.

7. The method of claim 1 wherein the shale inhibiting component is present in an amount in the range of from about 0.5% to about 10% by volume of the treatment fluid.

8. The method of claim 1 wherein the silicates comprise at least one of the following: sodium silicate; potassium silicate; or a derivative thereof.

9. The method of claim 1 wherein the silicates are present in an amount in the range of from about 0.5% to about 10% by volume of the treatment fluid.

10. The method of claim 1 wherein the treatment fluid further comprises at least one of the following: a salt; an antifoam; a biocide; a bridging agent; a corrosion control agent; a dispersant; a flocculant; a fluid loss additive; a foamer; a gas; a H2S scavenger; a lubricant; an oxygen scavenger; a scale inhibitor; a viscosifier; a weighting agent; or a derivative thereof.

11. A method of drilling in a subterranean formation, the method comprising:
   providing a drilling fluid comprising
      an aqueous base fluid,
      a shale inhibiting component that comprises a nanoparticle source, and
      one or more silicates;
   using the drilling fluid to drill in at least a portion of the subterranean formation.

12. The method of claim 11 wherein using the drilling fluid to drill in at least a portion of the subterranean formation comprises placing the drilling fluid in contact with the drill bit and the subterranean formation.

13. The method of claim 11 wherein using the drilling fluid to drill in at least a portion of the subterranean formation comprises drilling at least a portion of a well bore such that the well bore penetrates the subterranean formation.

14. The method of claim 11 wherein the shale inhibiting component comprises a nanoparticle source that comprises at least one of the following: a heterocyclic compound that comprises nitrogen; a rubber latex; or a derivative thereof.

15. The method of claim 11 wherein the heterocyclic compound that comprises nitrogen comprises polyvinyl pyrrolidone.

16. The method of claim 11 wherein the silicates comprise at least one of the following: sodium silicate; potassium silicate; or a derivative thereof.

* * * * *